United States Patent [19]

Solymes

[11] 4,409,008
[45] Oct. 11, 1983

[54] DUST DISPOSAL CYCLONES

[75] Inventor: Laszlo Solymes, Budapest, Hungary

[73] Assignee: Malom-Es Sutoipari Kutatointezet, Budapest, Hungary

[21] Appl. No.: 247,318

[22] Filed: Mar. 25, 1981

[30] Foreign Application Priority Data

May 29, 1980 [HU] Hungary .............................. 1346/80

[51] Int. Cl.³ ............................................ B01D 45/12
[52] U.S. Cl. ........................................ 55/261; 55/339;
55/392; 55/419; 55/458; 55/459 R
[58] Field of Search ................. 55/261, 339, 340, 392,
55/458, 419, 459 R, 459 B; 209/144

[56] References Cited

U.S. PATENT DOCUMENTS

| | | | |
|---|---|---|---|
| 1,408,693 | 3/1922 | Deily | 55/339 |
| 1,832,256 | 11/1931 | Stebbins | 55/459 R X |
| 1,861,247 | 5/1932 | Stebbins | 209/144 |
| 2,153,270 | 4/1939 | Osgood | 55/339 |
| 2,767,840 | 10/1956 | Dobson et al. | 55/459 R X |
| 3,254,478 | 6/1966 | Szego | 55/340 |
| 4,251,243 | 2/1981 | Salete-Garces | 55/261 |
| 4,260,401 | 4/1981 | Truhan et al. | 55/339 |

Primary Examiner—Kathleen J. Prunner
Attorney, Agent, or Firm—Young & Thompson

[57] ABSTRACT

A cyclone with a tangential peripheral inlet and a central axial outlet is improved as to efficiency by inducting air between the inlet and the outlet. The inducted air is diverted by a baffle that temporarily separates it from the dust-laden inlet air, the baffle being arcuate in the same direction as the wall of the separation chamber, so that the inducted relatively dust-free air forms an inner layer and the dust-laden air forms an outer layer in the separation chamber. This promotes the separation of the dust on the inner side of the outer wall of the chamber and so facilitates separation of the dust from the air. A portion of the outlet air from which the dust has been separated can also be recycled in a stream disposed on the other side of the inducted ambient air.

2 Claims, 4 Drawing Figures

DUST DISPOSAL CYCLONES

BACKGROUND OF THE INVENTION

1. Field of the Invention

This invention relates to dust disposal cyclones and more particularly to cyclones of the recycling type.

As is known, there are—for ecological reasons—very strict limits as to the amounts of dust which may be exhausted into the ambient atmosphere.

2. Description of the Prior Art

For the removal of dust from air various apparatus have been employed. One of them is the cyclone in which dust is removed by means of the centrifugal force generated in the dust laden air introduced tangentially into the cyclone. Dust particles are impelled towards the wall of the cyclone along which they descend while the air freed of dust ascends and withdraws through the clean air outlet of the cyclone. Such cyclones are distinguished by their low costs, simple structure and reliable operation since they have no moving component parts. However, the collection efficiency of such simple cyclones generally does not meet the requirements imposed by ecological considerations because finer dust particles will still be exhausted into the atmosphere with the withdrawn air.

In order to improve dust removal by means of cyclones it is known to connect two or more cyclones in series. It has, however, been found that the collection efficiency of the second cyclone of the series connection is considerably lower than that of the cyclone upstream thereof which is due to a materially lower dust load of the air introduced into the downstream cyclones of the series. In addition, the resistances of the cyclones to the airflow therethrough are additive which is undesirable for economy of energy.

Therefore, it has been suggested to use the clean air outlet of a cyclone as a second stage. The dust deposited on the wall of the clean air outlet is recycled from the clean air outlet into the dust collecting chamber of the cyclone. Thus, a double stage dust collection is obtained in a single cyclone as is the case with the recycling Typ MGXU of the firm Gebrüder Bühler AG Maschinenfabrik, Uzwill, Switzerland.

SUMMARY OF THE INVENTION

The main object of the present invention is to further improve the collection efficiency of dust disposal cyclones in general and of recycling cyclones in particular. The invention aims at a cyclone with high collection efficiency which for low investment costs and energy consumption reaches the collection efficiency of series connected cyclones in a single stage and meets the ecological requirements in a plurality of industrial fields.

The basic idea of the invention consists in the employment of what may be called secondary air which is introduced through a gap in the cyclone from the ambient atmosphere in such a manner that dust particles in the dust laden air-the primary air-introduced via the dust-laden air inlet of the cyclone are impelled towards the wall of the dust collecting chamber thereof whereby the collection efficiency of the cyclone considerably increases.

Thus, the invention is concerned with a dust disposal cyclone of the type comprising, in a manner known per se, a cyclone body confining a main cyclone or dust collecting chamber which has a clean air outlet connected to it. Both the cyclone body and the clean air outlet are concentrically arranged along a central axis of the cyclone while the clean air outlet protrudes into the dust collecting chamber so that the latter has an annular portion around the former. Furthermore, the dust collecting chamber has a dust laden air inlet connected to it one flank of which faces the clean air outlet.

In compliance with the main feature of the invention the flank of the dust laden air inlet facing the clean air outlet encloses a gap with the latter which connects the dust collecting chamber with the ambient atmosphere. It will be shown hereinafter that by the provision of such gap the amount of dust remaining in the exhausted clean air decreases by about 50% with respect to the amounts of dust carried away by the clean air withdrawn from conventional cyclones of similar sizes.

BRIEF DESCRIPTION OF THE DRAWING

Further objects and details of the invention will be described with reference to the accompanying drawing which shows—by way of example—a preferred embodiment of the cyclone according to the invention. In the drawing.

DESCRIPTION OF THE PREFERRED EMBODIMENT

Figure 2:
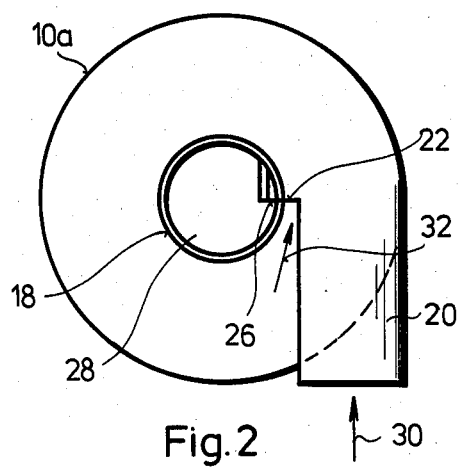
FIG. 2 shows a top view of the cyclone illustrated in FIG. 1.

In the drawing, reference character 10 designates the body of a dust disposal cyclone designed in accordance with the present invention. In the instant case, the body 10 of the cyclone consists, in a manner known per se, of a cylindrical top part 10a and of a downwardly tapering bottom part 10b. Both parts 10a and 10b enclose a dust collecting chamber 12. The bottom part 10b has a support ring 14 fixed to it and ends in a flange 16 with an orifice 16a therein by means of which the cyclone body 10 can be connected to a discharge continuous air-seal valve not shown but well known in the art.

In the top part 10a of the cyclone body 10 there is, likewise in a manner known per se, a central clean air outlet 18 in the form of a pipe which serves for exhausting dust-free air and is, in the instant case, connected to the suction side of a non-represented fan. A dust laden air inlet 20 is destined to let air to be cleaned enter into the dust collecting chamber 12 of the cyclone.

In compliance with the main feature of the invention there is a gap 22 between the clean air outlet 18 and the dust laden air inlet 20. In the represented embodiment this gap 22 is enclosed by the wall of the pipe forming the clean air outlet 18 and a flank 20a of the dust-laden air inlet 20 which faces the clean air outlet 18. The gap 22 opens into the dust collecting chamber 12. Such arrangement results in an increase of the collection efficiency since dust particles carried by the dust laden or primary air entering through the air inlet 20 are impelled by the auxiliary or secondary air flowing in through the gap 22 from the ambient atmosphere towards the wall of the dust collecting chamber 12 so that, subsequently, they are more readily dispelled by centrifugal action from the main air flow.

In the represented embodiment the flank 20a of the dust-laden air inlet 20 is parallel to the axis 24 of both the cyclone body 10 and the clean air outlet 18 which means, on the one hand, a simple manufacture of the gap 22 and, on the other hand, an aerodynamically favourable suction chamber formed by the clean air outlet 18 and the dust laden air inlet 20 downstream from the gap 22 as will be apparent to the skilled art worker.

Furthermore, as also in the represented embodiment, a passage 26 is provided in the wall of the clean air outlet 18 which opens from its enclosure 28 into an annular portion 12a of the dust collecting chamber 12 around the protruding portion of the pipe forming the clean air outlet 18 and, thus, connects the latter with the former. The advantage of the provision of such passage 26 consists in that the secondary air entering through the gap 22 at high velocity generates a sucking action in front of the passage 26 and thereby a considerable portion of the dust collected along the inner wall surface of the clean air outlet 18 becomes reconducted by a tertiary air flow into the dust collecting chamber 12 and, thus, recycled in the manner of double stage or recycling cyclones which, otherwise, use a separate fan for such purpose.

It will be apparent that, in the instant case, the gap 22 and the passage 26 are of equal lengths in the direction of the axis 24. The advantage of such feature consists in that the sucking action of the secondary air flowing through the gap 22 is fully exploited along the whole length of the passage 26. If the gap 22 were longer than the passage 26, a portion of the entering secondary air would be inefficient as regards the inflow of tertiary air. On the other hand, if the gap 22 were shorter than the passage 26, then an airflow would be entailed through the surplus portion of the passage 26 from the dust collecting chamber 12 of the cyclone into the clean air outlet 18 so that less dust would be recycled. Moreover, the introduced dust-laden primary air would withdraw directly through such surplus portion of the passage 26 bypassing the dust collecting chamber 12, and thus, reduce the collection efficiency.

Figure 3:
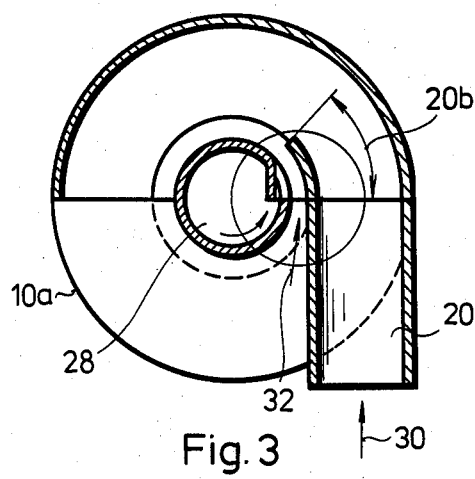
FIG. 3 represents a sectional view taken along line III—III of FIG. 1.
Figure 4:
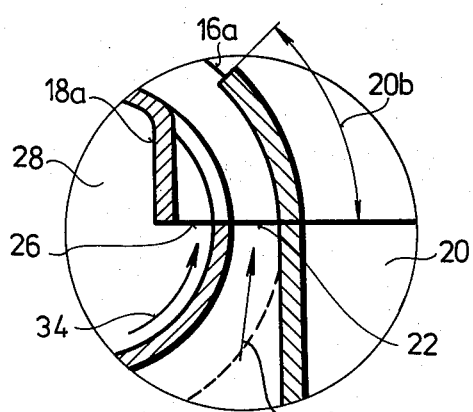
FIG. 4 illustrates a detail, indicated by a circle, of FIG. 3 on an enlarged scale.
Figure 1:
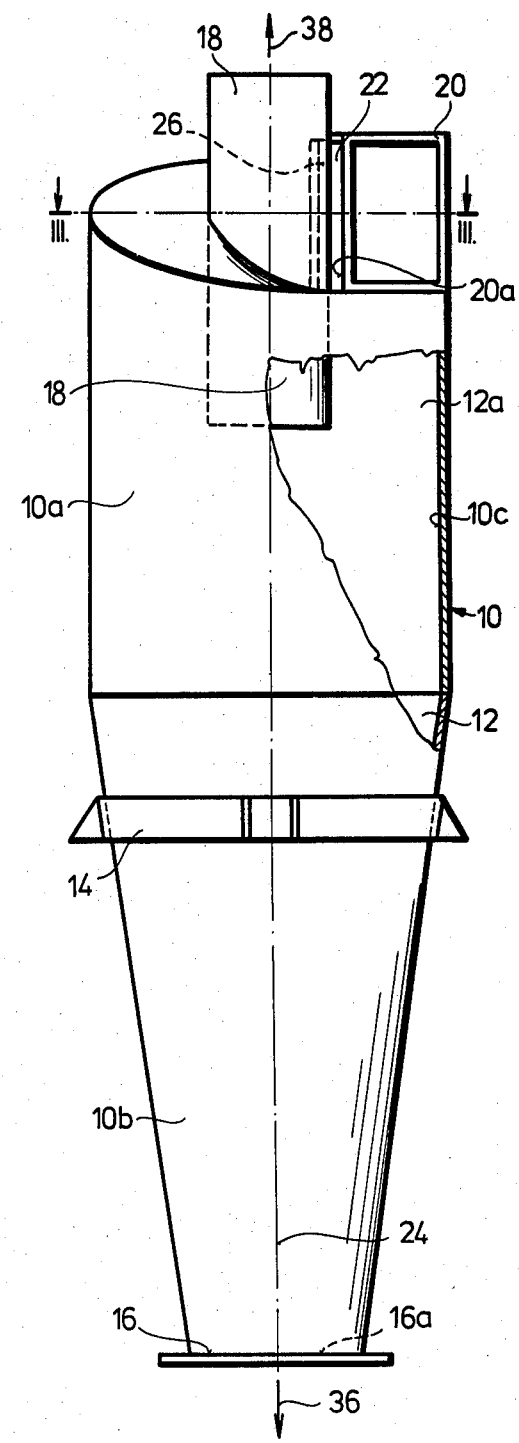
FIG. 1 is a front-elevational view of the preferred embodiment.

As can be seen from FIGS. 3 and 4, the flank 20a of the dust laden air inlet 20 has, in the instant case, an arcuate extension whose arcuate extent is shown at 20b which protrudes into the dust collecting chamber 12. The secondary airflow between extension 20b and the outer surface of the clean air outlet 18 prevents an undesired airflow from the dust collecting chamber 12 through the passage 26 into the clean air outlet 18 which might again reduce the collection efficiency and, thus, frustrate the main object of the present invention.

Furthermore, with the represented embodiment, the passage 26 in the clean air outlet 18 is provided within the confines of the latter for which purpose a portion 18a of its wall is bent inwardly. The peripheral portion of the ascending air or a dust layer which may have been deposited on the inner wall surface of the cylindrical clean air outlet 18 can reenter the dust collecting chamber 12 without flow direction changes and, thus, without loss of energy. In addition, the main flow of air in the dust collecting chamber 12 of the cyclone will not be disturbed by the passage 26 in the clean air outlet 18 which obviously would not be the case if e.g. the wall portion 18a were bent outwardly and, thus, the passage 26 were outside the confines of the clean air outlet 18.

In operation, the dust-laden primary air sucked in by the non-represented fan flows in a manner known per se through the dust laden air inlet 20 into the dust collecting chamber 12 of the cyclone as indicated by an arrow 30. At the same time, in compliance with the main feature of the present invention, also secondary air is sucked in from the ambient atmosphere through the gap 22 likewise into the dust collecting chamber 12 as indicated by an arrow 32. By such secondary air dust particles carried by the primary air will be impelled towards the inner wall surface 10c of the cyclone body 10 within the annular portion 12a of the dust collecting chamber 12 so that, subsequently, they are more thoroughly removed from the main airflow.

Moreover, the depression caused by the secondary airflow between clean air outlet 18 and extension 20b in front of the passage 26 causes a tertiary airflow from the clean air outlet 18 into the annular portion 12a of the dust collecting chamber 12 as indicated by an arrow 34 which flows then likewise towards the periphery of the cyclone, thus, recycling the dust carried by the ascending air and/or deposited on the inner wall surface of the clean air outlet 18.

The main airflow which consists, in the instant case, of the primary, the secondary and the tertiary air, descends in a first vortex along the wall of the dust collecting chamber 12 and flings any larger dust particles thereagainst whence they are collected and discharged through the orifice 16a in flange 16 in a manner known per se, as indicated by an arrow 36. A cone-like second vortex, likewise in a per se known manner, travels in an upward movement along the axis 24 of the cyclone carrying fine particles which have not reached the wall of the dust collecting chamber 12 in the first operation, towards and into the clean air outlet 18 where its dust laden outer skin is removed by the inwardly bent wall portion 18a of the clean air outlet 18 and reintroduced into the dust collecting chamber 12 by the tertiary airflow through the passage 26 as indicated by the arrow 34 so as to be recycled in the same cyclone.

Clean air is withdrawn from the clean air outlet 18 as indicated by an arrow 38.

The efficiency of dust disposal by means of the cyclone according to the invention can be displayed by the results of experiments:

It has been found that the amount of secondary air and tertiary airflow through gap 22 and passage 26, respectively, are practically insignificant with respect to the amount of primary air introduced via the dust laden air inlet 20. Thus, only a small increase of energy consumption need be reckoned with.

The following specific values show the increase of collection efficiency in case of cyclones according to the invention with respect to cyclones of conventional design.

Type of dust . . . Quartz comprising particles
   below 3 micrometers 13%
   below 5 micrometers 25%
   below 10 micrometers 40%
   below 20 micrometers 53%
Dust load . . . 10 grams per cubic meter
Inflow velocity . . . 17 meters per second
Volume . . . 1000 cubic meters per hour
Collection efficiency of conventional cyclones without gap and passage . . . 89.5%
Collection efficiency of cyclones according to the invention with gap only . . . 93.0%
Collection efficiency of cyclones according to the invention with gap and passage . . . 95.2%

The conventional cyclone with the relatively low collection efficiency of 89.5% has been chosen to obtain as wide a measuring range as possible.

Laboratory measurements have shown that by employing cyclones according to the invention the amount of dust carried away by the withdrawn clean air has been reduced by about 50% with respect to conventional cyclones of similar capacity.

A further advantage of the invention consists in that existing cyclones of conventional design can relatively simply be transformed into cyclones according to the invention with a considerable increase of their collection efficiency. It is only necessary to provide a gap between their dust laden air inlet and clean air outlet, and a passage in their clean air outlet, e.g. as disclosed above.

By employing the invention also the scope of application of cheap and simple cyclones will be considerably enlarged since, then, they are suitable to meet ecological requirements without any material increase of energy consumption.

Hereinbefore, the invention has been described with reference to a cyclone operated by a suction fan. Obviously, pressure fans can likewise be employed in which case the pressure side of the fan would be connected to the dust-laden air inlet of the cyclone as will be apparent to those skilled in the art.

I claim:

1. In a dust disposal cyclone of circular cross-sectional configuration having a tangential inlet for dust-laden air and an axial outlet for dust-freed air, said outlet protruding into the cyclone; the improvement in which the inlet has a flank facing but spaced from the outlet by a gap defined by and between said flank and said outlet and communicating between the ambient air and the interior of the cyclone, through which gap ambient air is inducted by the dust-laden air that enters through the inlet, and an arcuate baffle between the inducted air and the dust-laden air in the inlet, the baffle being arcuate in the same direction as the outer wall of the cyclone to deflect the inducted air into the same direction in which the dust-laden air from the inlet rotates in the cyclone.

2. A cyclone as claimed in claim 1, and a passage communicating between the dust-freed air in the outlet and the inducted air, thereby to supply air from said outlet into the stream of inducted air on the side of the stream of inducted air which is opposite the dust-laden air in the inlet.

* * * * *